US012453307B2

(12) United States Patent
Roth et al.

(10) Patent No.: US 12,453,307 B2
(45) Date of Patent: Oct. 28, 2025

(54) ROTARY CUTTER-BAR WITH BLADE SENSOR

(71) Applicant: DEERE & COMPANY, Moline, IL (US)

(72) Inventors: Darin L. Roth, Batavia, IA (US); Joshua D. Graeve, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 478 days.

(21) Appl. No.: 17/935,171

(22) Filed: Sep. 26, 2022

(65) Prior Publication Data

US 2024/0099188 A1  Mar. 28, 2024

(51) Int. Cl.
*A01D 34/37* (2006.01)
*A01D 34/03* (2006.01)

(52) U.S. Cl.
CPC ............ *A01D 34/37* (2013.01); *A01D 34/03* (2013.01)

(58) Field of Classification Search
CPC ...... A01D 34/37; A01D 34/03; A01D 34/006; A01D 34/664
See application file for complete search history.

(56) References Cited

U.S. PATENT DOCUMENTS

| | | | | |
|---|---|---|---|---|
| 4,257,040 A * | 3/1981 | Shirasaki | ................. | G01D 5/14 340/870.31 |
| 7,536,846 B1 * | 5/2009 | Pruitt | .................... | A01D 34/828 56/13.6 |
| 10,117,379 B2 * | 11/2018 | Guiet | ................... | A01D 34/736 |
| 2022/0055129 A1 * | 2/2022 | Heitsman | ............. | A01G 23/091 |

FOREIGN PATENT DOCUMENTS

| | | | |
|---|---|---|---|
| EP | 1522214 A2 | | 4/2005 |
| JP | 2002337042 A | * | 11/2002 |
| RU | 2609907 C1 | | 2/2017 |
| RU | 2754449 C1 | | 9/2021 |
| WO | WO 2012034872 A1 | | 3/2012 |
| WO | WO 2017222368 A1 | | 12/2017 |

OTHER PUBLICATIONS

Ning Chen et al., High Speed Rotation Estimation with Dynamic Vision Sensors, Sep. 2022, last accessed Jul. 8, 2025 at https://arxiv.org/pdf/2209.02205 (Year: 2022).*

Extended European Search Report and Written Opinion issued in European Patent Application No. 23193255.9, dated Feb. 7, 2024, in 08 pages.

* cited by examiner

*Primary Examiner* — Scott A Browne
*Assistant Examiner* — Josephine Elizabeth Rich

(57) ABSTRACT

A mower implement includes a cutter bar extending along a central bar axis. A rotating blade assembly is mounted on the cutter bar. The rotating blade assembly includes a disc rotatable about a disc rotation axis relative to the cutter bar, and at least one blade pivotably mounted to the disc. A blade sensor is mounted on the cutter bar. The blade sensor has a sensing field, and is positioned to detect movement of the at least one blade of the rotating blade assembly through the sensing field during each rotation of the disc about the disc rotation axis. A diagnostic controller receives the data signal from the blade sensor and is configured to analysis the blade signal and identify a fault in the rotating blade assembly. The diagnostic controller may then notify an operator of the identified fault.

8 Claims, 7 Drawing Sheets

ROTARY CUTTER-BAR WITH BLADE SENSOR

TECHNICAL FIELD

The disclosure generally relates to a mower implement.

BACKGROUND

A cutter bar style mower implement includes a cutter bar having a plurality of rotating blade assemblies attached thereto. The cutter bar includes a drive for rotating the blade assemblies. The drive rotates each respective rotating blade assembly about a respective rotation axis for cutting crop material.

Each blade assembly may include a disc that is attached to and driven or rotated by the drive. The disc extends radially outward from the respective rotation axis to a radially outer disc edge. One or more blades may be attached to the disc proximate the radially outer disc edge. Each blade may be rotatably attached to the disc to allow free rotational movement of the blade relative to the disc. Centrifugal force during operation causes the blade to extend radially outward from the rotation axis, while the rotatable connection between the blade and the disc enables the blade to deflect or rotate relative to the disc when an object, e.g., a rock or a stump, is encountered. In many implementations, the rotating blade assembly will include two blades disposed on diametrically opposite sides of the disc. However, in other implementations, the number of the blades may vary. For example, each rotating blade assembly may include only a single blade, three blades, four blades, etc.

The blades and other components of the rotating blade assembly may be considered wear items, which require occasional replacement. Additionally, the rotating blade assemblies are subject to damage during use, such as when striking a rock, stump, etc. The condition of the rotating blade assemblies, and particularly the blades thereof, must be monitored so that they may be replaced when necessary.

SUMMARY

A mower implement is provided. The mower implement includes a cutter bar extending along a central bar axis. A rotating blade assembly is mounted on the cutter bar. The rotating blade assembly includes a disc rotatable about a disc rotation axis relative to the cutter bar, and at least one blade pivotably mounted to the disc. A blade sensor is mounted on the cutter bar. The blade sensor has a sensing field. The blade sensor is positioned to detect movement of the at least one blade of the rotating blade assembly through the sensing field during each rotation of the disc about the disc rotation axis.

In one aspect of the disclosure, the blade sensor may include one of, but is not limited to, an electromagnetic induction sensor, an optical sensor, a magnetic sensor, a light sensor, a radar sensor, and an ultrasonic sensor.

In one aspect of the disclosure, the mower implement may further include a diagnostic controller disposed in communication with the blade sensor. The diagnostic controller includes a processor and a memory having a blade diagnostic algorithm stored thereon. The processor is operable to execute the blade diagnostic algorithm to receive a data signal from the blade sensor related to the at least one blade of the rotating blade assembly cyclically moving through the sensing field of the blade sensor during a period of time. The diagnostic controller may further identify a fault associated with the rotating blade assembly from the data signal received from the blade sensor, and communicate a notification signal including the identified fault to a communicator.

In one aspect of the disclosure, the cutter bar may include a barrier shaped to protect the blade sensor, particularly from crop and other materials entering the mower implement during operation.

In one implementation of the disclosure, the blade sensor is positioned below the disc and the at least one blade of the rotating blade assembly relative to a direction of gravity. However, in other implementations of the disclosure, the blade sensor may be positioned above the disc and the at least one blade of the rotating blade assembly relative to the direction of gravity.

In one aspect of the disclosure, the mower implement may include a plurality of rotating blade assemblies. For example, the mower implement may include a first rotating blade assembly and a second rotating blade assembly mounted on the cutter bar. Each of the first rotating blade assembly and the second rotating blade assembly include a respective disc rotatable about a respective disc rotation axis relative to the cutter bar, and at least one respective blade pivotably mounted to the respective disc thereof. The blade sensor may be mounted on the cutter bar and positioned to detect movement of the at least one respective blade of both of the first rotating blade assembly and the second rotating blade assembly through the sensing field during each rotation of the respective disc about the respective disc rotation axis of the first rotating blade assembly and the second rotating blade assembly.

In one aspect of the disclosure, the blade sensor may be positioned between the first rotating blade assembly and the second rotating blade assembly along the central bar axis, such that the sensing field of the blade sensor is positioned to detect the at least one respective blade from each of the first rotating blade assembly and the second rotating blade assembly. For example, the blade sensor may be positioned approximately midway between the first rotating blade assembly and the second rotating blade assembly along the central bar axis.

In one aspect of the disclosure, the mower implement may further include a drive interconnecting the first rotating blade assembly and the second rotating blade assembly. The drive is operable to transmit a torque to and between the first rotating blade assembly and the second rotating blade assembly for rotating the respective disc of the first rotating blade assembly and the respective disc of the second rotating blade assembly. The diagnostic controller may be configured to receive a driven data signal from the blade sensor, when torque is applied to the first rotating blade assembly and the second rotating blade assembly via the drive, related to the at least one respective blade of the first rotating blade assembly and the at least one respective blade of the second rotating blade assembly cyclically moving through the sensing field of the blade sensor during a period of time. The diagnostic controller may further be configured to receive a coast data signal from the blade sensor, when torque is not applied to the first rotating blade assembly and the second rotating blade assembly via the drive, related to the at least one respective blade of the first rotating blade assembly and the at least one respective blade of the second rotating blade assembly cyclically moving through the sensing field of the blade sensor during a period of time. The diagnostic controller may then compare the driven data signal to the coast data signal to determine a current backlash in the drive between the first rotating blade assembly and the second rotating blade assembly, and then compare the current backlash to a threshold backlash value to determine if the current backlash is less than the threshold backlash value, or if the current backlash is equal to or greater than the threshold backlash value. When the current backlash is equal to or greater than the threshold backlash value, the diagnostic controller may communicate a notification signal indicating a wear level in the drive to a communicator.

Accordingly, using the blade sensor, the mower implement described above is capable of monitoring and diagnosing the status of the rotating blade assemblies of the mower implement, and communicating that status to an operator via the communicator.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
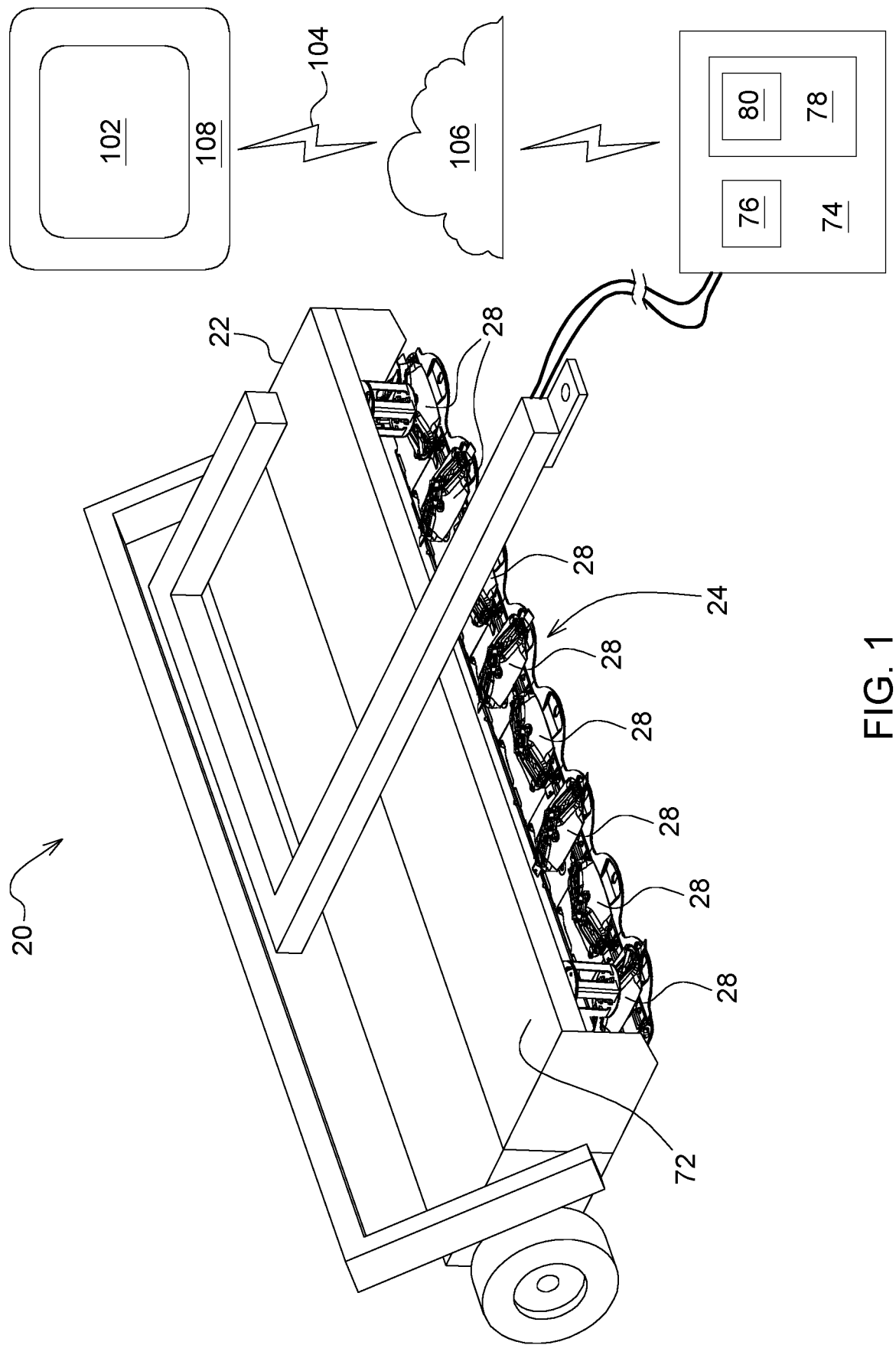
FIG. 1 is a schematic perspective view of a mower implement.

Referring to the Figures, wherein like numerals indicate like parts throughout the several views, an example implementation of a mower implement is generally shown at 20 in FIG. 1. The example implementation of the mower implement 20 shown in the Figures and described herein is configured to be attached to and powered by a traction unit, such as but not limited to a tractor or other similar vehicle. The mower implement 20 may be mounted behind the traction unit, or in front of the traction unit relative to a direction of travel. In other implementations, the mower implement 20 may be integrated with the traction unit, i.e., a self-propelled mower implement 20.

The mower implement 20 includes a frame 22 supporting a cutter bar 24. The cutter bar 24 extends between the right-side outer wall and the left-side outer wall, and is located adjacent a forward edge of the mower implement 20. The cutter bar 24 extends along a central bar axis 26, which is arranged generally perpendicular to a direction of travel during operation. The cutter bar 24 includes a plurality of rotating blade assemblies 28 attached thereto. The rotating blade assemblies 28 are aligned in a row parallel with the central bar axis 26.

Figure 4:
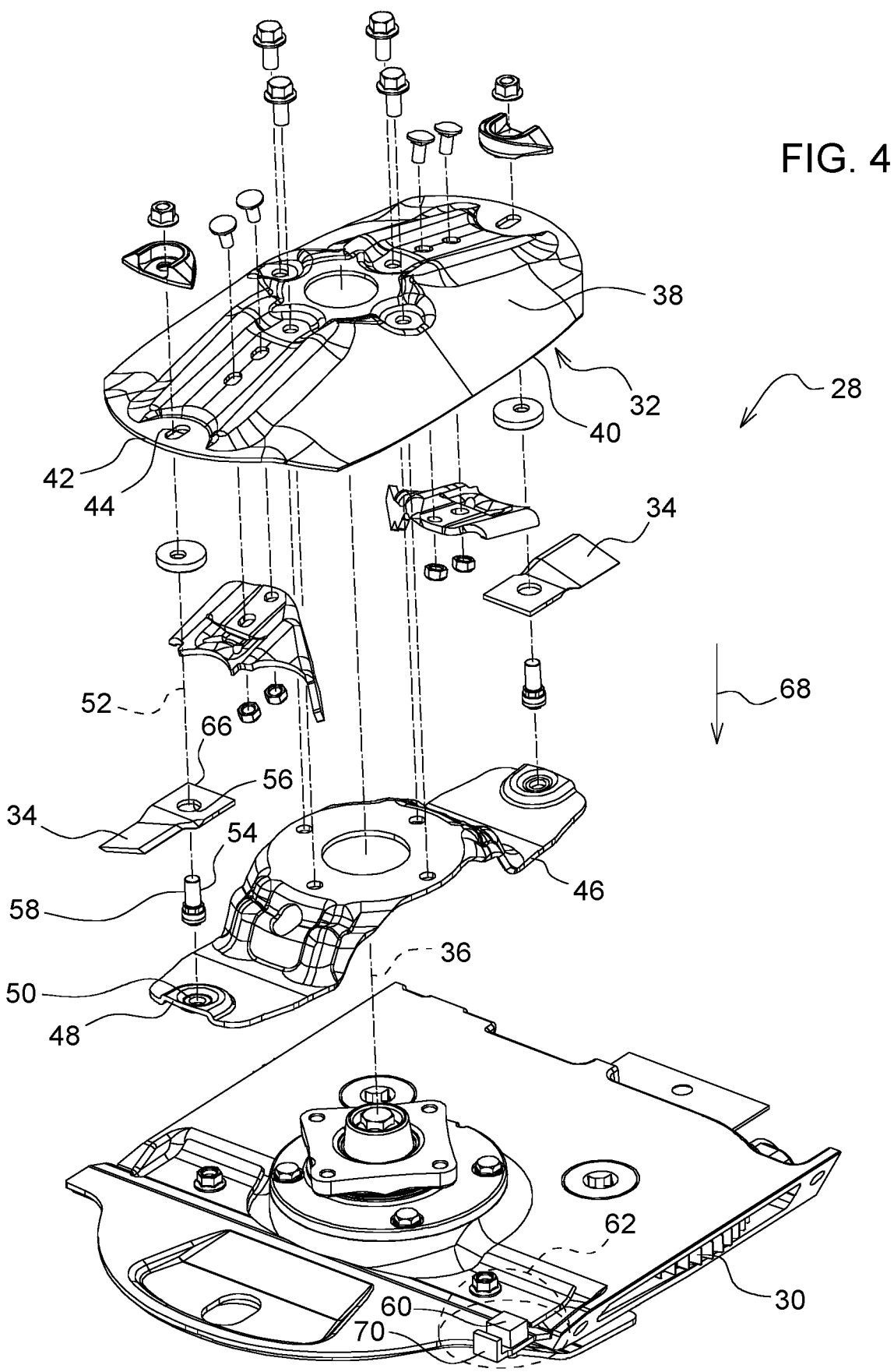
FIG. 4 is a schematic exploded perspective view of a rotating blade assembly of the mower implement.
Figure 5:
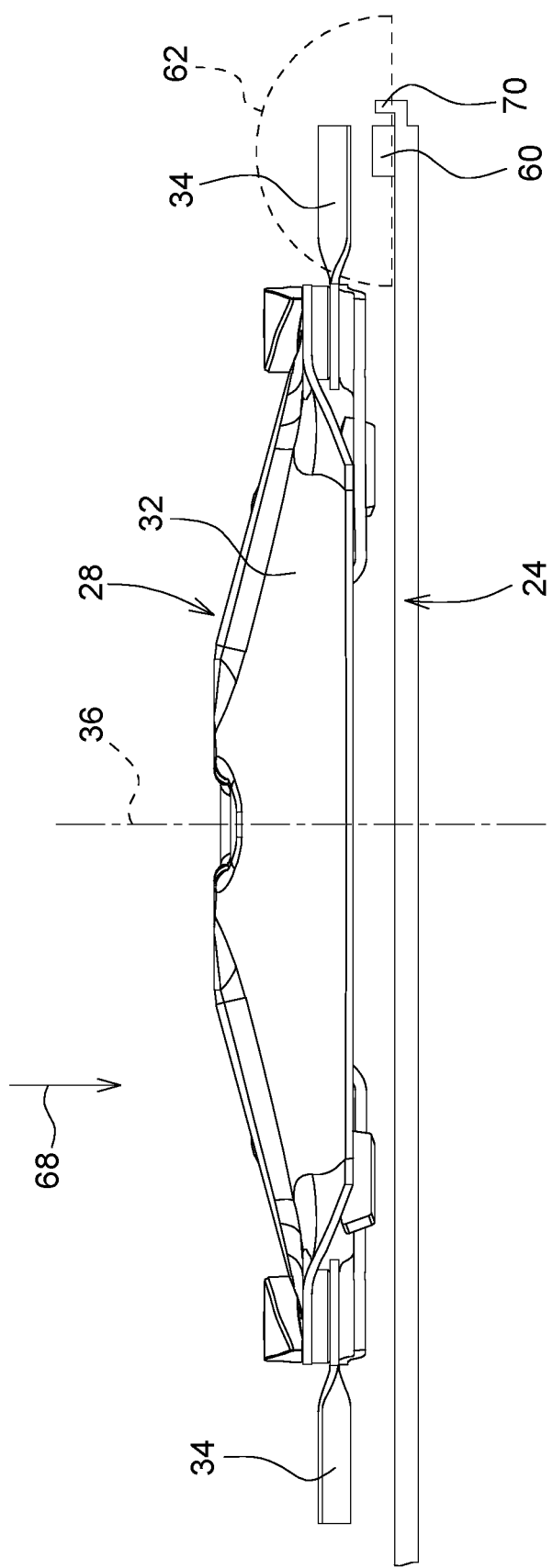
FIG. 5 is a schematic cross sectional view of the mower implement.

As shown in FIG. 4, the cutter bar 24 includes a drive 30 for rotating the plurality of rotating blade assemblies 28. The drive 30 interconnects the plurality of rotating blade assemblies 28, and is operable to transmit a torque to and between the plurality of blade 34 assemblies for rotating a respective disc 32 of and associated blades 34 thereof. The drive 30 rotates each respective rotating blade assembly 28 about a respective disc rotation axis 36 for cutting crop material, such as but not limited to, hay, alfalfa, grasses, etc.

The drive 30 may include, but is not limited to, a plurality of intermeshed spur gears including a plurality of idler gears meshed with each other and arranged in transverse alignment over the length of the cutter bar 24, with selected ones of the idler gears being meshed with drive gears respectively associated, one each, with a plurality of cutting discs 32 spaced along the cutter bar 24. The components, features, and operation of the cutter bar 24 and the drive 30 that rotates each of the respective rotating blade assemblies 28 are understood by those skilled in the art, are not pertinent to the teachings of his disclosure, and therefore not described in greater detail herein.

Figure 2:
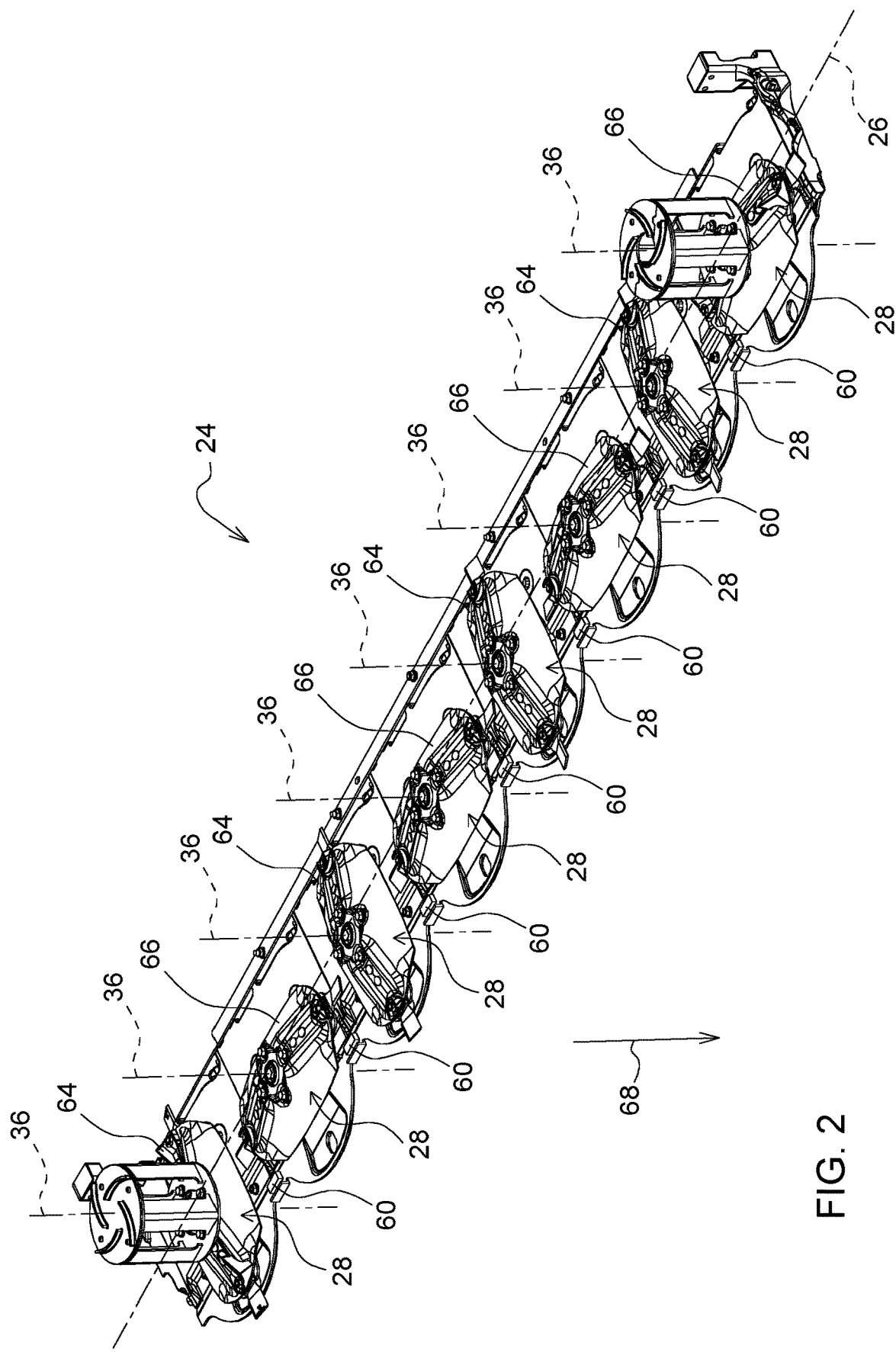
FIG. 2 is a schematic perspective view of a cutter bar of the mower implement.
Figure 3:
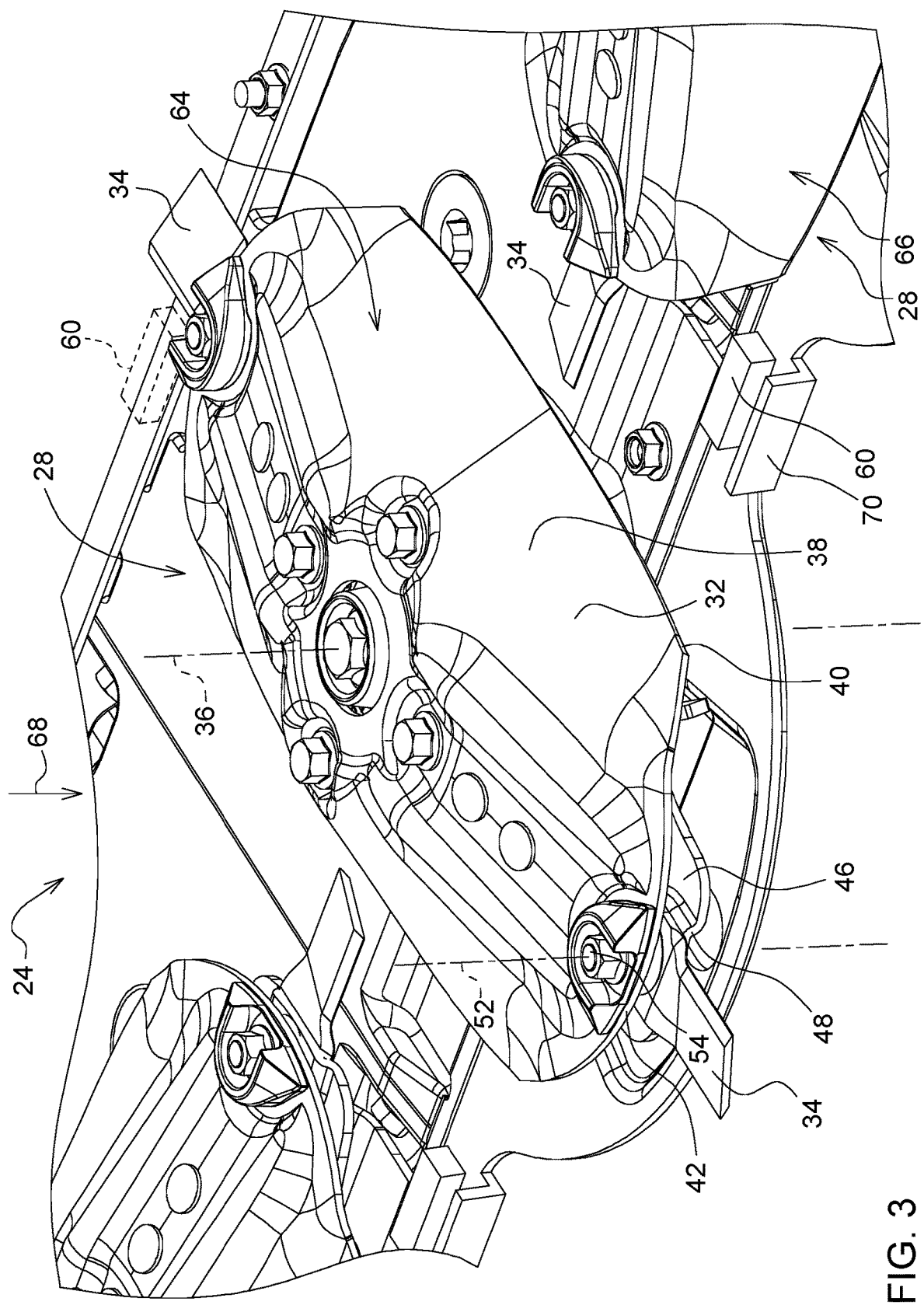
FIG. 3 is an enlarged fragmentary schematic perspective view of the mower implement.

Referring to FIG. 2 and as described above, the mower implement 20 includes a plurality of rotating blade assemblies 28 mounted on the cutter bar 24. Referring to FIGS. 3 and 4, a single rotating blade assembly 28 of the mower implement 20 is generally shown. While only a single rotating blade assembly 28 is shown in detail and described below, it should be appreciated that all of the rotating blade assemblies 28 of the mower implement 20 may be similarly constructed. The rotating blade assembly 28 includes a disc 32 that is drivenly attached to the drive 30 of the cutter bar 24. For example, the disc 32 may be attached to a respective flange, which is in turn attached to and driven by the drive 30 of the cutter bar 24. The disc 32 is driven by the drive 30 of the cutter bar 24 for rotation about a respective disc rotation axis 36. The disc rotation axis 36 extends generally orthogonal to platelike structure of the disc 32. In normal operation of the mower implement 20, in which crop material is cut, the disc 32 is arranged substantially parallel to a ground surface, with the disc rotation axis 36 extending generally vertically.

The disc 32 includes a rigid, platelike structure having a first or upper surface 38, and a second or lower surface 40. The lower surface 40 is positioned toward the cutter bar 24, whereas the upper surface 38 is positioned away from the cutter bar 24. The platelike structure of the disc 32 is substantially inflexible. For example, the disc 32 may be manufactured from steel plate having a thickness and shape to prevent or limit deflection during operation. The example implementation of the disc 32 shown in the Figures and described herein includes the upper surface 38 and the lower surface 40 of the disc 32 defining a generally oval shape. However, it should be appreciated that the disc 32 may include some other shape not shown or described herein.

The disc 32 extends radially outward away from the disc rotation axis 36 to a radially outer disc edge 42. The disc 32 defines a mounting aperture 44 proximate the radially outer disc edge 42. In the example implementation of the disc 32 shown in the Figures and described herein, the mounting aperture 44 is positioned along a long dimension of the oval shape, near the radially outer disc edge 42. The mounting aperture 44 extends through the disc 32, in a direction substantially parallel with the disc rotation axis 36.

A spring plate 46 is positioned between the cutter bar 24 and the lower surface 40 of the disc 32. The spring plate 46 is coupled to and rotatable with the disc 32. The spring plate 46 is coupled to the disc 32 proximate the disc rotation axis 36, and extends radially outward away from the disc rotation axis 36 to a radially outer plate edge 48. The spring plate 46 is not attached to the disc 32 adjacent to or near the radially outer plate edge 48. The spring plate 46 defines a pocket 50 disposed proximate the radially outer plate edge 48, and aligned with the mounting aperture 44 along a mounting axis 52. The mounting axis 52 is substantially parallel to the disc rotation axis 36. In one implementation, the pocket 50 may include an aperture or bore that extends through the spring plate 46 in a direction parallel to the disc rotation axis 36. In other implementations, the pocket 50 may include a recess or depression orientated with a concave shape facing the lower surface 40 of the disc 32.

The spring plate 46 is configured to exhibit a bias force at the pocket 50 in a direction toward the disc 32. The spring plate 46 may be manufactured from, but is not limited to, a spring steel or other similar material. As such, the spring plate 46 may exhibit some flexure. The bias force at the pocket 50 is directed in a direction that is substantially parallel with the disc rotation axis 36, and generally perpendicular to the bottom surface of the disc 32.

A retaining pin 54 is engaged with the mounting aperture 44 of the disc 32 and the pocket 50 of the spring plate 46. The retaining pin 54 may be attached to one of the disc 32 or the spring plate 46, and disposed in abutting engagement with the other of the disc 32 and the spring plate 46. In the example implementation shown in the Figures and described herein, the retaining pin 54 is attached to the disc 32, and extends from the lower surface 40 of the disc 32 toward and into abutting engagement with the spring plate 46. A distal end of the retaining pin 54 engages and/or is seated within the pocket 50. The retaining pin 54 may be attached to the disc 32 in any suitable manner. For example, the retaining pin 54 may include a threaded portion that extends through the mounting aperture 44 of the disc 32, and which is threaded into a nut positioned against the upper surface 38 of the disc 32. It should be appreciated that the retaining pin 54 may be attached to the disc 32 in some other manner not shown or described herein.

A blade 34 is positioned between the disc 32 and the spring plate 46. The blade 34 includes a body defining a pin aperture 56. The pin aperture 56 extends through the body of the blade 34 in a direction substantially parallel with the disc rotation axis 36. The pin aperture 56 is substantially aligned with the mounting aperture 44 and the pocket 50 along the mounting axis 52.

The retaining pin 54 includes a shaft portion 58. The shaft portion 58 of the retaining pin 54 extends through the pin aperture 56 of the blade 34. With the distal end of the retaining pin 54 engaged with the pocket 50, the bias force exerted by the spring plate 46 at the pocket 50 urges the spring plate 46 into engagement against the retaining pin 54, thereby securing the spring plate 46 relative to the retaining pin 54. With the retaining pin 54 attached to the disc 32, and the spring plate 46 biased against the distal end of the retaining pin 54, the blade 34 is captured by the retaining pin 54 between the disc 32 and the spring plate 46.

The disc 32 of each of the rotating blade assemblies 28 may include one or more blades 34 attached as described above. In one example implementation, each rotating blade assembly 28 includes two blades 34 disposed on diametrically opposite sides of the disc rotation axis 36, i.e., one hundred eighty degrees apart about the disc rotation axis 36. However, in other implementations, each respective disc 32 may include a single blade 34, three blades 34, four blades 34, etc.

A blade sensor 60 is mounted on the cutter bar 24. The blade sensor 60 includes and/or exhibits a sensing field 62. The sensing field 62 of the blade sensor 60 may be described as a three-dimensional region within which the blade sensor 60 is capable of detecting movement. As such, the sensing field 62 may be considered an effective range of the blade sensor 60. The blade sensor 60 is positioned to detect movement of the blade 34 of an associated one of the rotating blade assemblies 28 through the sensing field 62 during each rotation of the disc 32 about the disc rotation axis 36.

As described above, the cutter bar 24 may include a plurality of rotating blade assemblies 28. For example, referring to FIGS. 2 and 3, the cutter bar 24 may include a first rotating blade assembly 64 and a second rotating blade assembly 66. The blade sensor 60 may be mounted on the cutter bar 24 in a position to detect movement through the sensing field 62 of the respective blade 34 of both of the first rotating blade assembly 64 and the second rotating blade assembly 66 during each rotation of the respective disc 32 about the respective disc rotation axis 36 of the first rotating blade assembly 64 and the second rotating blade assembly 66. In other words, the blade sensor 60 may be positioned to detect the blade 34 of two different rotating blade assemblies 28. It should be appreciated that in other implementations, each respective rotating blade assembly 28 may have a respective, dedicated blade sensor 60. In the example implementation shown in the Figures and described herein, the blade sensor 60 is positioned between the first rotating blade assembly 64 and the second rotating blade assembly 66 along the central bar axis 26, such that the sensing field 62 of the blade sensor 60 is positioned to detect the respective blade 34 from each of the first rotating blade assembly 64 and the second rotating blade assembly 66. While the example implementation shown in the Figures shows the blade sensor 60 positioned approximately midway between the first rotating blade assembly 64 and the second rotating blade assembly 66, it should be appreciated that in other implementations the blade sensor 60 may be positioned directly behind a dedicated blade sensor, such as shown in phantom in FIG. 3, or at some other location along the central bar axis 26. As such, the position of the blade sensor 60 relative to one or more of the rotating blade assemblies may differ from the example implementation shown in the Figures.

In one implementation of the disclosure, such as shown in solid lines of FIGS. 2 and 3, the blade sensor 60 may be positioned below the disc 32 and the blade 34 of the rotating blade assembly 28 relative to a direction of gravity 68, and along a leading edge of the cutter bar 24 relative to a direction of travel during operation. For example, the blade sensor 60 may be mounted on the cutter bar 24, below the disc 32 and the blade 34 of the associated rotating blade assembly 28. The cutter bar 24 may be shaped and/or formed to include a barrier 70 to protect the blade sensor 60 from damage from objects entering the mower implement 20. The barrier 70 may include, but is not limited to, a shield, a cover, a lip, a protrusion in front of the blade sensor 60, or some other structure capable of shielding the blade sensor 60 from contact with an object or diverting an object to prevent contact with the blade sensor 60.

In another implementation of the disclosure, the blade sensor 60 may be positioned above the disc 32 and the blade 34 of the associated rotating blade assembly 28 relative to the direction of gravity 68. For example, the blade sensor 60 may be mounted on a top wall 72 of the frame 22, above the disc 32 and the blade 34 of the associated rotating blade assembly 28. The top wall 72 of the frame 22 may be shaped and/or formed to include the barrier 70 to protect the blade sensor 60 from damage from objects entering the mower implement 20. The barrier 70 may include, but is not limited to, a shield, a cover, a lip, a protrusion in front of the blade sensor 60, or some other structure capable of shielding the blade sensor 60 from contact with an object or diverting an object to prevent contact with the blade sensor 60.

In other implementations, the blade sensor 60 may be positioned above or below the respective rotating blade assembly 28, along a trailing edge of the cutter bar 24 relative to a direction of travel of the mower implement during operation, such as shown in phantom in FIG. 3.

The blade sensor 60 may include, but is not limited to, one of an electromagnetic induction sensor, an optical sensor, a magnetic sensor, a light sensor, a radar sensor, or an ultrasonic sensor. The specific mode of operation of the blade sensor 60 is dependent upon the configuration of the blade sensor 60. In one example implementation, the blade sensor 60 includes an electromagnetic induction sensor positioned below the disc 32 and the blade 34 of an associated rotating blade assembly 28 relative to the direction of gravity 68. Preferably, the blade sensor 60 is positioned between two adjacent rotating blade assemblies 28, e.g., the first rotating blade assembly 64 and the second rotating blade assembly 66. However, in other implementations, the blade sensor 60 may be dedicated to a single rotating blade assembly 28 and be positioned immediately in front of the rotating blade assembly 28 relative to a direction of travel of the mower implement 20 during operation.

Referring to FIG. 1, a diagnostic controller 74 is disposed in communication with the blade sensor 60. The diagnostic controller 74 is operable to receive a data signal 82 from the blade sensor 60. While the diagnostic controller 74 is generally described herein as a singular device, it should be appreciated that the diagnostic controller 74 may include multiple devices linked together to share and/or communicate information therebetween. Furthermore, it should be appreciated that the diagnostic controller 74 may be located on the mower implement 20 or located remotely from the mower implement 20, such as for example, on an associated work vehicle, e.g., a tractor.

The diagnostic controller 74 may alternatively be referred to as a computing device, a computer, a controller, a control unit, a control module, a module, etc. The diagnostic controller 74 includes a processor 76, a memory 78, and all software, hardware, algorithms, connections, sensors, etc., necessary to implement the process described herein. As such, a method may be embodied as a program or algorithm operable on the diagnostic controller 74. It should be appreciated that the diagnostic controller 74 may include any device capable of analyzing data from various sensors, comparing data, making decisions, and executing the required tasks.

As used herein, "diagnostic controller 74" is intended to be used consistent with how the term is used by a person of skill in the art, and refers to a computing component with processing, memory, and communication capabilities, which is utilized to execute instructions (i.e., stored on the memory 78 or received via the communication capabilities) to control or communicate with one or more other components. In certain embodiments, the diagnostic controller 74 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The diagnostic controller 74 may be in communication with other components on the mower implement 20 or associated work vehicle, such as hydraulic components, electrical components, and operator inputs within an operator station of an associated work vehicle. The diagnostic controller 74 may be electrically connected to these other components by a wiring harness such that messages, commands, and electrical power may be transmitted between the diagnostic controller 74 and the other components. Although the diagnostic controller 74 is referenced in the singular, in alternative embodiments the configuration and functionality described herein can be split across multiple devices using techniques known to a person of ordinary skill in the art.

The diagnostic controller 74 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 78 may include any non-transitory/tangible medium which participates in providing data or computer-readable instructions. The memory 78 may be non-volatile or volatile. Non-volatile media may include, for example, optical or magnetic disks and other persistent memory. Example volatile media may include dynamic random access memory (DRAM), which may constitute a main memory. Other examples of embodiments for memory 78 include a floppy, flexible disk, or hard disk, magnetic tape or other magnetic medium, a CD-ROM, DVD, and/or any other optical medium, as well as other possible memory devices such as flash memory.

The diagnostic controller 74 includes the tangible, non-transitory memory 78 on which are recorded computer-executable instructions, including a blade diagnostic algorithm 80. The processor 76 of the diagnostic controller 74 is configured for executing the blade diagnostic algorithm 80. The blade diagnostic algorithm 80 implements a method of monitoring a status of the rotating blade assemblies 28 of the mower implement 20, described in detail below.

The diagnostic controller 74 receives a data signal 82 from the blade sensor 60 related to the blade 34 of the rotating blade assembly 28 cyclically moving through the sensing field 62 of the blade sensor 60 during a period of time. In other words, the data signal 82 is related to the detection or presence of the blade 34 within the sensing field 62. The data signal 82 detects the presence of the blades 34 of the associated disc 32 in the sensing field 62 during each revolution of the disc 32 over the period of time. If the blade sensor 60 is positioned to detect the blades 34 associated with two different rotating blade assemblies 28, e.g., the first rotating blade assembly 64 and the second rotating blade assembly 66, then the data signal 82 will include data related to the detection or presence of the blades 34 of each of the respective rotating blade assemblies 28. For example, the data signal 82 from the blade sensor 60 includes data related to the respective blades 34 of the first rotating blade assembly 64 and the respective blades 34 of the second rotating blade assembly 66 cyclically moving through the sensing field 62 of the blade sensor 60 during the period of time.

The diagnostic controller 74 is configured to identify a fault associated with the rotating blade assembly 28 from the data signal 82 received from the blade sensor 60. If the blade sensor 60 is positioned to detect the blades 34 associated with two different rotating blade assemblies 28, e.g., the first rotating blade assembly 64 and the second rotating blade assembly 66, then the diagnostic controller 74 may be configured to monitor the status of the first rotating blade assembly 64 and the second rotating blade assembly 66, and identify a fault associated with one of the first rotating blade assembly 64 and the second rotating blade assembly 66 from the data signal 82 received from the blade sensor 60.

Figure 6:
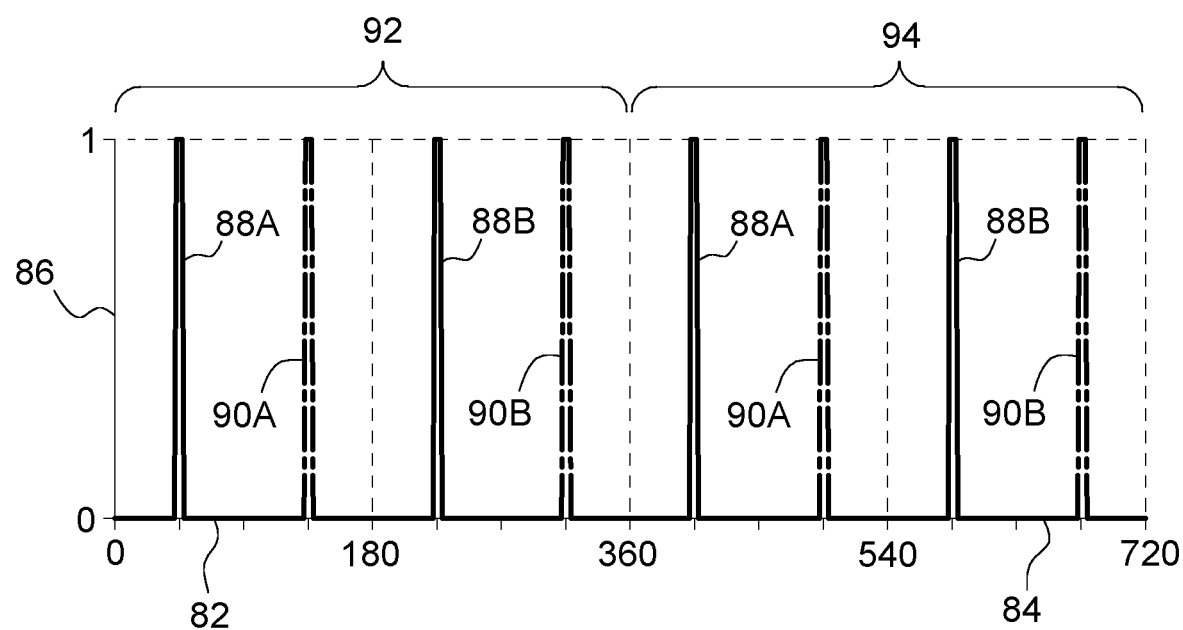
FIG. 6 is a schematic graph showing a data signal from the blade sensor over a period of time representing normal operation of the rotating blade assembly.

Referring to FIG. 6, the data signal 82 from the blade sensor 60 is shown over a cyclical angular periods indicated along a horizontal axis 84. The presence or detection of a blade 88A, 88B, 90A, 90B in the sensing field 62 of the blade sensor 60 is indicated along a vertical axis 86. The data signal 82 shown in FIG. 6 represents normal operation of both the first rotating blade assembly 64 and the second rotating blade assembly 66. In the example shown in FIG. 6, each of the first rotating blade assembly 64 and the second rotating blade assembly 66 include two blades diametrically opposed to each other at one hundred eighty degrees of separation. The first rotating blade assembly 64 and the second rotating blade assembly 66 are timed to rotate in unison with a ninety-degree offset between the respective blades 34. As such, the blade sensor 60 should detect one blade within the sensing field 62 every ninety degrees of rotation. In the example shown in FIG. 6, the data signal 82 indicates the detection of a first blade of the first rotating blade assembly 64 at 88A, and a second blade of the first rotating blade assembly 64 at 88B. The data signal 82 indicates the detection of a first blade of the second rotating blade assembly 66 at 90A, and a second blade of the second rotating blade assembly 66 at 90B. A first three hundred sixty degree rotation period of the first rotating blade assembly 64 and the second rotating blade assembly 66 is indicated by a first period 92. A second three hundred sixty degree rotation period of the first rotating blade assembly 64 and the second rotating blade assembly 66 is indicated by a second period 94. As shown in FIG. 6, each detection signal of the blades 88A, 88B, 90A, 90B occurs at a ninety degree rotation interval throughout both the first period 92 and the second period 94 while under power, indicating normal operation of the first rotating blade assembly 64 and the second rotating blade assembly 66.

Figure 7:
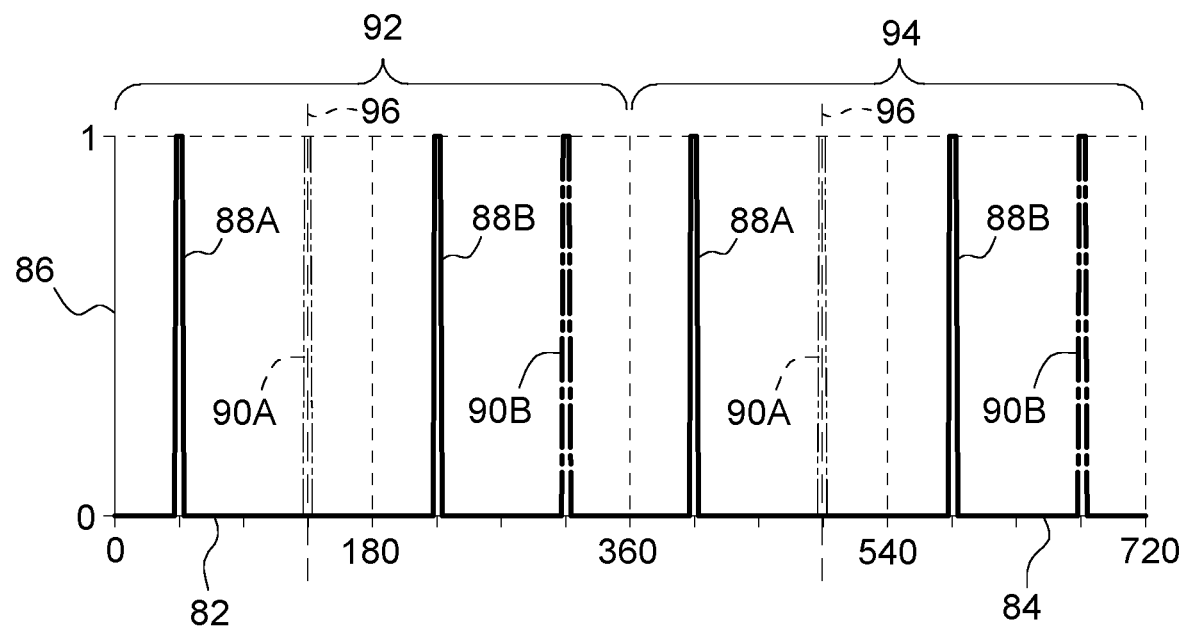
FIG. 7 is a schematic graph showing the data signal from the blade sensor over the period of time representing a first fault type in the rotating blade assembly.

Referring to FIG. 7, the data signal 82 from the blade sensor 60 is shown over the cyclical angular periods indicated along the horizontal axis 84. The presence or detection of a blade in the sensing field 62 of the blade sensor 60 is indicated along the vertical axis 86. The data signal 82 shown in FIG. 7 represents operation of both the first rotating blade assembly 64 and the second rotating blade assembly 66. In the example shown in FIG. 7, the first rotating blade assembly 64 includes two blades diametrically opposed to each other at one hundred eighty degrees of separation, whereas the second rotating blade assembly 66 includes only one blade, i.e., one of the two blades of the second rotating blade assembly 66 is missing or for some reason is not detected by the blade sensor 60. The first rotating blade assembly 64 and the second rotating blade assembly 66 are timed to rotate in unison with a ninety degree offset between the respective blades 34. As such, the blade sensor 60 should detect one blade within the sensing field 62 every ninety degrees of rotation. In the example shown in FIG. 7, the data signal 82 indicates the detection of a first blade of the first rotating blade assembly 64 at 88A, and a second blade of the first rotating blade assembly 64 at 88B. The data signal 82 indicates the detection of a second blade of the second rotating blade assembly 66 at 90B. A first three hundred sixty degree rotation period of the first rotating blade assembly 64 and the second rotating blade assembly 66 is indicated by a first period 92. A second three hundred sixty degree rotation period of the first rotating blade assembly 64 and the second rotating blade assembly 66 is indicated by a second period 94. As shown in FIG. 7, the blade sensor 60 does not detect the presence of a blade at angular position 96. The diagnostic controller 74 may determine that the first blade 90A (shown in Phantom) of the second rotating blade assembly 66 is missing based on the lack of detection of a blade at angular position 96.

Figure 8:
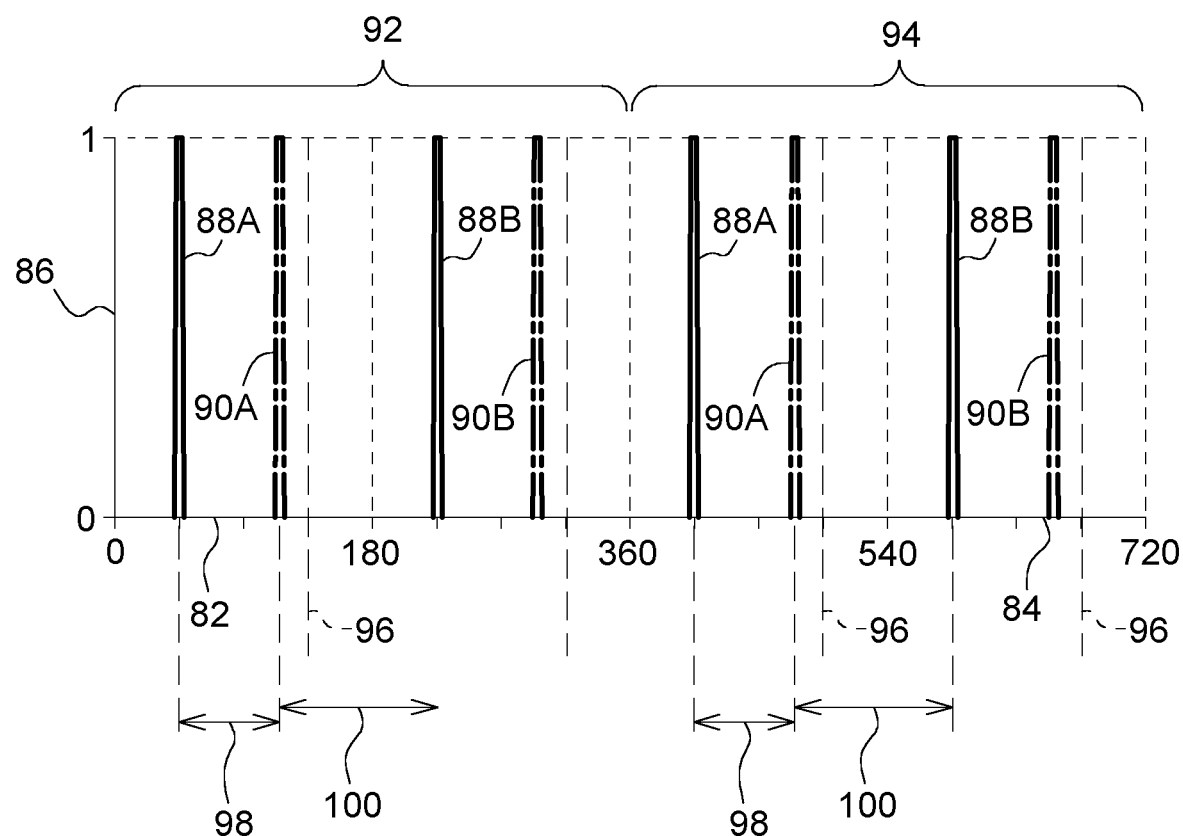
FIG. 8 is a schematic graph showing the data signal from the blade sensor over the period of time representing a second fault type in the rotating blade assembly.

In another example, referring to FIG. 8, the data signal 82 from the blade sensor 60 is shown over the cyclical angular periods indicated along the horizontal axis 84. The presence or detection of a blade in the sensing field 62 of the blade sensor 60 is indicated along the vertical axis 86. The data signal 82 shown in FIG. 8 represents operation of both the first rotating blade assembly 64 and the second rotating blade assembly 66. In the example shown in FIG. 8, each of the first rotating blade assembly 64 and the second rotating blade assembly 66 include two blades diametrically opposed to each other at one hundred eighty degrees of separation. The first rotating blade assembly 64 and the second rotating blade assembly 66 are timed to rotate in unison with a ninety degree offset between the respective blades 34. As such, the blade sensor 60 should detect one blade 34 within the sensing field 62 every ninety degrees of rotation (which is not shown by the data signal 82). In the example shown in FIG. 8, the data signal 82 indicates the detection of a first blade of the first rotating blade assembly 64 at 88A, and a second blade of the first rotating blade assembly 64 at 88B.

The data signal 82 indicates the detection of a first blade of the second rotating blade assembly 66 at 90A, and a second blade of the second rotating blade assembly 66 at 90B. A first three hundred sixty degree rotation period of the first rotating blade assembly 64 and the second rotating blade assembly 66 is indicated by a first period 92. A second three hundred sixty degree rotation period of the first rotating blade assembly 64 and the second rotating blade assembly 66 is indicated by a second period 94. The data signal 82 indicates an angular separation 98 between the first blade 88A of the first rotating blade assembly 64 and the first blade 90A of the second rotating assembly is less than ninety degrees, and that an angular separation 100 between the first blade 90A of the second rotating blade assembly 66 and the second blade 88B of the first rotating assembly is greater than ninety degrees. As shown in FIG. 8, the data signal 82 indicates that the blades 88A, 88B of the first rotating blade assembly 64 and the blades 90A, 90B of the second rotating blade assembly 66 are not timed at the desired ninety degree interval.

The diagnostic controller 74 may be configured to detect normal operation and several different fault modes in the rotating blade assemblies 28 of the mower implement 20. For example, the diagnostic controller 74 may detect a missing blade 34 such as shown in FIG. 8, or a mistimed rotating blade assembly 28 such as shown in FIG. 8. Other types of fault modes may also be identified by the diagnostic controller 74, such as but not limited to, a bent blade, a stuck blade, a shorn drive gear, a header slowdown, or a failure of the blade sensor.

The diagnostic controller 74 may communicate a notification signal 104 to a communicator 102. The notification signal 104 may include an indication or normal operation, or an identified fault. The communicator 102 may include, but is not limited to, a visual display and/or an audio display of the mower implement 20, an associated work vehicle, e.g., a tractor, or a remote computing device 108. The diagnostic controller 74 may communicate the notification signal 104 though a wired connection or a wireless connection. In other implementations, the diagnostic controller 74 may communicate the notification signal 104 via a cloud-based server 106 to a remote location housing the remote computing device 108. The notification signal 104 may include a description of the identified fault, or a simple malfunction indicator.

In one aspect of the disclosure the diagnostic controller 74 may be configured to receive a driven data signal 82 and a coast data signal 82 from the blade sensor 60. The driven data signal 82 is related to the respective blades 34 of the first rotating blade assembly 64 and the respective blades 34 of the second rotating blade assembly 66 cyclically moving through the sensing field 62 of the blade sensor 60 during a period of time when torque is applied to the first rotating blade assembly 64 and the second rotating blade assembly 66 via the drive 30. The coast data signal 82 is related to the respective blades 34 of the first rotating blade assembly 64 and the respective blades 34 of the second rotating blade assembly 66 cyclically moving through the sensing field 62 of the blade sensor 60 during a period of time when torque is not applied to the first rotating blade assembly 64 and the second rotating blade assembly 66 via the drive 30. As such, the driven data signal 82 represents a period in which the rotating blade assemblies 28 are operating under power, and the coast data signal 82 represents a period in which the rotating blade assemblies 28 are not powered and their inertia overrides the frictional content of the drive 30.

The diagnostic controller 74 may then compare the driven data signal 82 to the coast data signal 82 to determine a current backlash in the drive 30 between the first rotating blade assembly 64 and the second rotating blade assembly 66. The backlash in the drive 30 represents an amount of lash between the gears of the drive 30. Excessive gear lash may indicate wear between the gears requiring gear replacement. The diagnostic controller 74 may then compare the current backlash to a threshold backlash value to determine if the current backlash is less than the threshold backlash value, or if the current backlash is equal to or greater than the threshold backlash value. When the current backlash is greater than the threshold backlash value, the drive 30 may include excessive lash between the gears, allowing the timing between the first rotating blade assembly 64 and the second rotating blade assembly 66 to differ when under power vs. when not being powered.

When the diagnostic controller 74 determines that the current backlash is equal to or greater than the threshold backlash value, the diagnostic controller 74 may communicate the notification signal 104 to the communicator 102. The notification signal 104 may indicate a wear level in the drive 30.

The system described above enable an operator to monitor the status of the mower implement 20, in particular the rotating blade assemblies 28 and the blades 34 of the mower implement 20. Based on the particular notification signal 104, the operator may determine to check the blades 34 and/or disc 32s of the rotating blade assemblies 28, or the drive 30 of the mower implement 20.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A mower implement comprising:
   a cutter bar extending along a central bar axis;
   a first rotating blade assembly and a second rotating blade assembly mounted on the cutter bar, each of the first rotating blade assembly and the second rotating blade assembly including a respective disc rotatable about a respective disc rotation axis relative to the cutter bar, and at least one respective blade pivotably mounted to the respective disc of each of the first rotating blade assembly and the second rotating blade assembly;
   a blade sensor mounted on the cutter bar and having a sensing field, wherein the blade sensor is positioned to detect movement of the at least one respective blade on the respective disc of the first rotating blade assembly and the at least one respective blade on the respective disc of the second rotating blade assembly through the sensing field during each rotation of the respective disc about the respective disc rotation axis of the first rotating blade assembly and the respective disc about the respective disc rotation axis of the second rotating blade assembly.

2. The mower implement set forth in claim 1, wherein the blade sensor is positioned between the first rotating blade assembly and the second rotating blade assembly along the central bar axis, such that the sensing field of the blade sensor is positioned to detect the at least one respective blade from each of the first rotating blade assembly and the second rotating blade assembly.

3. The mower implement set forth in claim 1, wherein the blade sensor includes one of an electromagnetic induction sensor, an optical sensor, a magnetic sensor, a light sensor, a radar sensor, and an ultrasonic sensor.

4. The mower implement set forth in claim 1, further comprising a diagnostic controller in communication with the blade sensor, wherein the diagnostic controller includes a processor and a memory having a blade diagnostic algorithm stored thereon, wherein the processor is operable to execute the blade diagnostic algorithm to:
   receive a data signal from the blade sensor related to the at least one respective blade of the first rotating blade assembly and the at least one respective blade of the second rotating blade assembly cyclically moving through the sensing field of the blade sensor during a period of time;
   identify a fault associated with one of the first rotating blade assembly and the second rotating blade assembly from the data signal received from the blade sensor based on the presence or absence of the at least one respective blade of the first rotating blade assembly and the at least one respective blade of the second rotating blade assembly during each rotation of their respective disc about their respective disc rotation axis; and
   communicate a notification signal including the identified fault to a communicator.

5. The mower implement set forth in claim 1, wherein the cutter bar includes a barrier shaped to protect the blade sensor.

6. The mower implement set forth in claim 1, wherein the blade sensor is positioned below the first rotating blade assembly and the second rotating blade assembly relative to a direction of gravity.

7. The mower implement set forth in claim 1, wherein the blade sensor is positioned above the first rotating blade assembly and the second rotating blade assembly relative to a direction of gravity.

8. The mower implement set forth in claim 4, wherein the fault is one of a missing one of the at least one blade, a mistimed rotating blade assembly, a bent one of the at least one blade, or a shorn gear drive of the cutter bar.

* * * * *